July 6, 1954  H. W. COLE, JR  2,683,224
FLOWMETER
Filed Aug. 14, 1951  2 Sheets-Sheet 1

INVENTOR.
Howard W. Cole, Jr.
BY Emery, Varney,
Whittemore & Dix
ATTORNEYS

Patented July 6, 1954

2,683,224

UNITED STATES PATENT OFFICE 2,683,224

FLOWMETER

Howard W. Cole, Jr., Mountain Lakes, N. J.

Application August 14, 1951, Serial No. 241,854

12 Claims. (Cl. 290—52)

This invention relates to apparatus for measuring the rate of flow and total flow of fluid in a conduit.

One object of the invention is to provide an improved flow measuring device. The device can be used with different kinds of fluid.

The flow measuring device is useful in a flow meter system which is a mechanical electronic device for the precision measurement of both flow rate and total discharged fluid in either volumetric or gravimetric units. The flow sensing device is a small axially mounted, bladed rotor installed in the fluid system so that the liquid to be measured causes the rotor to revolve. Rotation of the rotor produces a definite, predetermined number of electrical pulses for each revolution. Thus the electrical output contains both rate information (output frequency) and total flow information (total number of pulses). The electrical output is a linear function of the volumetric flow, since the rotational speed of the rotor is determined only by the effective blade angle and the effective cross-sectional area of the flow passage at the blade location. The unit therefore is practically insensitive to all other fluid factors such as temperature, pressure, viscosity (within operating limits), specific gravity, etc. The fact that the bladed rotor covers almost all of the effective flow area makes the unit insensitive to flow approach characteristics, turbulence, entrance angles, etc. This valuable characteristic is due to the averaging ability of the multi-bladed rotor.

Another feature relates to the construction of the sensing unit with the operating parts carried on a ring for insertion in a pipe line in which fluid flow is to be measured. The ring has openings for bolts that connect flanged fittings to opposite sides of the ring, preferably with internal threads on the fittings. In the preferred embodiment of the invention, the ring is made of plastic with bar magnets and the coils molded in the plastic; and the rotor comprises a plastic hub with metal vanes molded into the plastic.

Other objects, features, and advantages of the invention will appear or be pointed out as the description proceeds.

In the drawing, forming a part hereof, in which like reference characters indicate corresponding parts in all the views.

Figure 1:
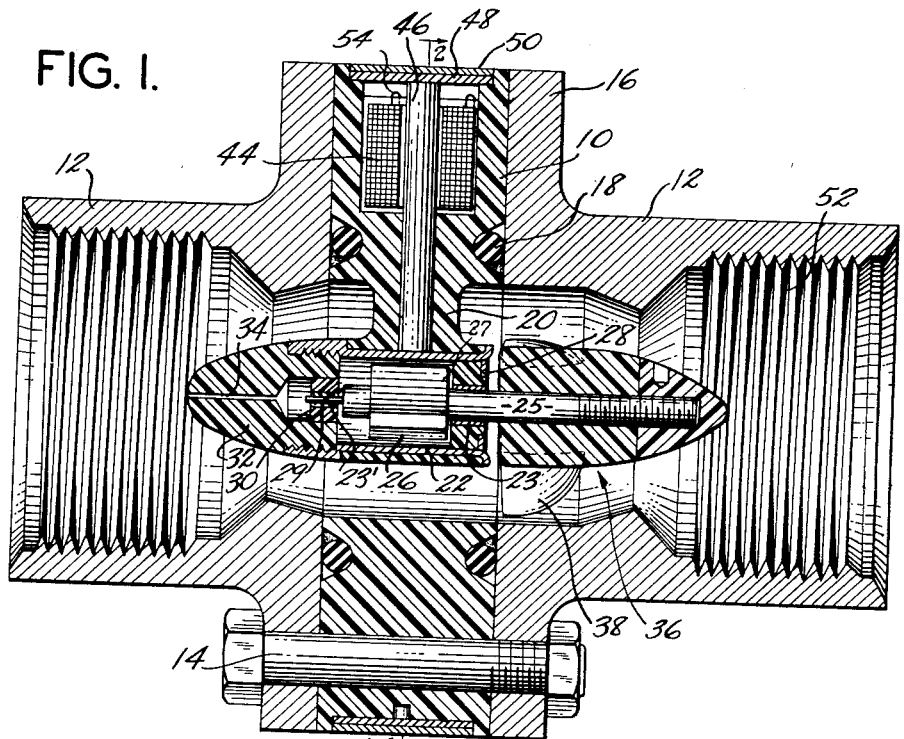
Figure 1 is a sectional view, on the line 1—1 of Fig. 2, through a flow sensing unit embodying this invention.

Figure 1 shows a short length of conduit or ring 10 which, in the illustrated construction, is of substantially greater diameter than length. This ring or conduit 10 is clamped between pipe fittings 12 by bolts 14. There is a circle of bolts 14 extending through holes in flanges 16 of the pipe fittings 12. The conduit 10 is preferably made of plastic material and sealed against leakage by O-rings 18 located in grooves in the opposite end faces of the conduit 10.

Figure 2:
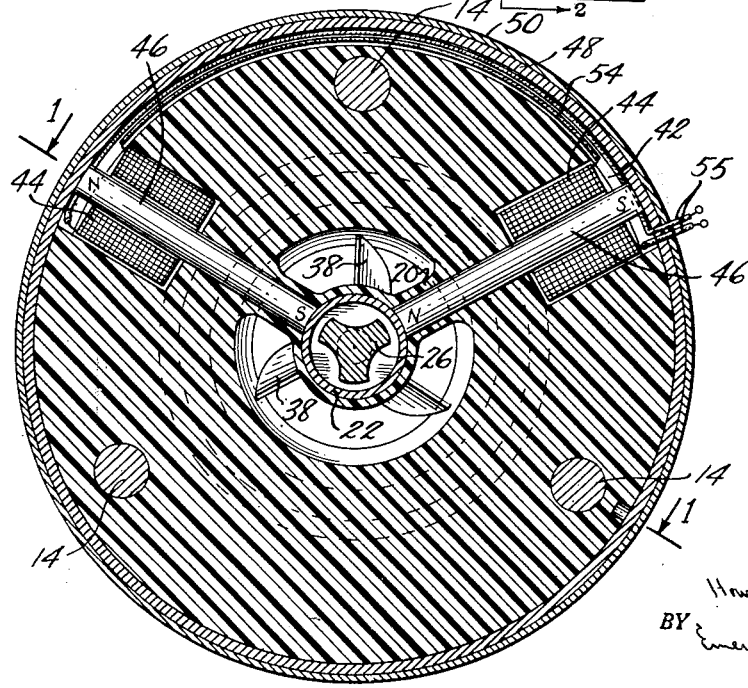
Figure 2 is a sectional view taken on the line 2—2 of Figure 1.

There is a bearing support 20 extending from the inside wall of the conduit 10. This bearing support is connected with the wall at two places, as shown in Fig. 2, and is preferably an integral part of the plastic conduit 10. There is an opening through the bearing support 20 substantially coaxial with the opening through the conduit 10.

A bearing sleeve 22 is carried by the bearing support 20. A shaft 25 rotates in bearings 23 and 23', and there is an armature 26 on the shaft 25. The rearward face 27 of the armature serves as a thrust bearing against rearward displacement by contacting, if necessary, with the end face of the bearing 23 or a holder 28 that supports the bearing 23 in the bearing sleeve 22. A shoulder 29 of the shaft 25 serves as a thrust bearing to prevent forward displacements of the armature 26 by contacting, if necessary, with the rearward face of the bearing 23' which is held in a deflector 32.

The deflector 32 has a blunt nose for deflecting a stream of fluid around the sides of the longitudinally extending portion of the bearing support 20. A bleed opening 34 in the deflector 32 permits some fluid to enter the chamber of the deflector in which the bearing 23' is located. This exerts a limited rearward pressure against the end of the shaft 25 to balance a portion of the forward component of pressure exerted against the tail of a rotor 36 which is screwed, or otherwise secured, to the rearward portion of the shaft 25.

The rotor 36 is preferably made of plastic material with metal vanes 38 that have their lower ends molded into the plastic hub of the rotor.

The rearward end of the rotor hub is tapered with the length of the taper coordinated with the intended velocity of the fluid so as to obtain fluid pressure against the sloping face of the rotor hub with a component of force exerted forward in a direction parallel to the longitudinal axes of the shaft 25. The forward component is so proportioned that it substantially balances the rearward or downstream thrust of the flowing fluid against the rotor blades. This feature, which will be understood in the art, reduces friction in the bearings of the shaft 25 so that the speed of rotation of the rotor and its connected shaft is substantially proportional to the rate of flow of the fluid without having to make allowance for increased bearing friction with increased rate of flow.

There are two recesses 42 in the plastic wall of the conduit 10 and there are coils of wire 44 housed in these recesses 42. A magnetic core, preferably a permanent bar magnet 46, extends through the coil of wire 44 and through the wall of the conduit and through a portion of the bearing support 20 to a termination in or adjacent to the bearing sleeve 22. When the conduit 10 is made of plastic the coils of wire 44 and the bar magnets 46 are preferably molded in the plastic.

The bar magnet 46, that extends through one of the coils 44, has its north pole located adjacent to the bearing sleeve 22, whereas the other bar magnet has its south pole located adjacent to the bearing sleeve 22. The armature 26, as it rotates past the pole faces of the bar magnets 46, creates a variable air gap between the armature and the pole faces of the bar magnets. This disturbs the flux pattern of the bar magnets 46 and causes a shift in the lines of flux in and around the coils of wire 44 thus generating a voltage in the coils of wire 44.

Figure 3:
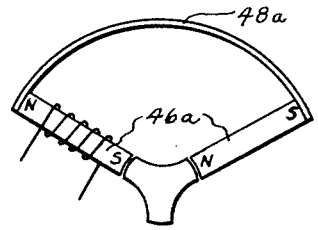
Figure 3 is a schematic view of another form of the flow sensing unit, illustrating the use of an iron band which extends only part way around the periphery of the conduit.
Figure 4:
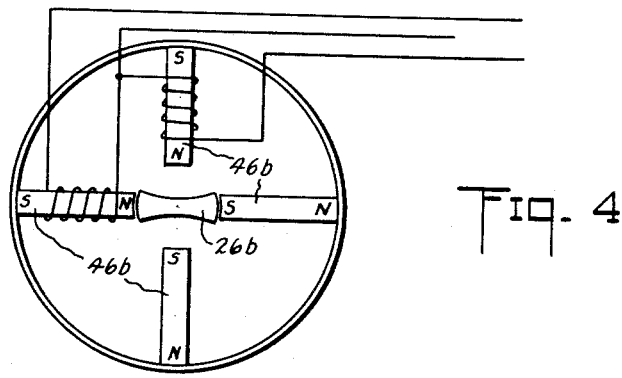
Figure 4 is a schematic view of a portion of another form of the flow sensing unit, illustrating the use of four magnets.
Figure 5:
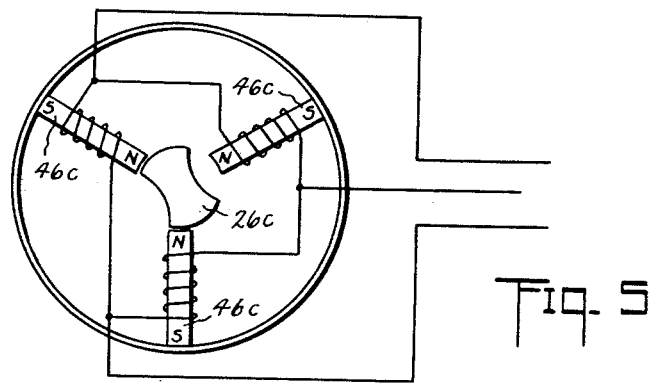
Figure 5 is a schematic view of a portion of another form of the flow sensing unit, illustrating the use of three magnets.

The flux field of the magnets 46 is completed, across the outer ends of the magnets, by an iron band 48 that contacts with the outer pole faces of the bar magnets 46. In the construction illustrated, this band 48 extends all the way around the periphery of the conduit 10, but it is sufficient to have it extend from one bar magnet to the other, as shown in Fig. 3, in which there are shown magnets 46a, and an iron band 48a extending around the perimeter of the assembly through the shorter arc from one of the magnets 46a to the other, but not around the remainder of the perimeter. More than one pair of magnets can be used if desired, as shown in Figures 4 and 5. There is schematically shown in Figure 4 an arrangement including four magnets, 46b, and an armature 26b adapted to provide, as it rotates, a varying magnetic path between opposite magnets for varying their flux. The arrangement in Fig. 5 has three magnets, 46c, and an armature 26c adapted to vary the flux of each in succession. The angular spacing of the magnets 46 is preferably the same as the angular spacing of the poles of the armature 26, but this is not essential. The iron band 48 fits into a groove in the peripheral face of the conduit 10. There is an outer ornamental cover band 50 over the magnetic iron band 48.

The pipe fittings 12 preferably have internal threads 52. Such threads are better protected against injury because of their location within the pipe fittings. The inside wall of each of the fittings, inward of the threads 52, is shaped with a change in cross section along the length of the fittings in the regions of the deflector 32 and in the region of the tail of the rotor 36. The deflection and variation in the velocity of the fluid stream at the throat of these fittings 12 provide a better control of the fluid pressure against the deflector 32 and the tail piece 36.

The conduit 10 can be made of short length because of the fact that the bearing sleeve 22, the deflector 32, the shaft 25 and the rotor 36 are allowed to project beyond the ends of the conduit 10 and into the aligned passages through the fittings 12. This feature of the construction reduces the overall width of the assembly.

The coils of wire 44 are connected together by a conductor 54 and these coils are connected with the electric circuit of the apparatus by wires 55 leading away from the conduit 10. The vanes 36 are shaped so as to extend at an angle to the direction of flow of the fluid through the conduit 10 so that contact of the fluid with the vanes imparts rotary motion to the vanes and rotor. For more efficient operation, the vanes have a curved contour in accordance with the practice well understood in the art.

The flow sensing unit described herein is useful for measuring fluid flow, with or without apparatus for compensating for the density of the fluid being measured.

Figure 6:
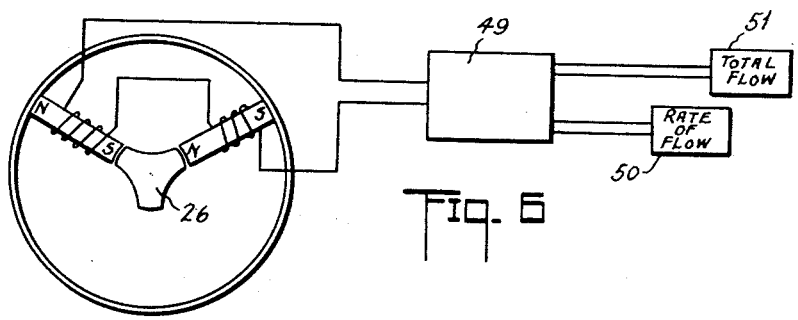
Figure 6 is a schematic view of a portion of the flow sensing unit of Figs. 1 and 2, showing generally the manner in which its output may be utilized.

As an aid to understanding how the flow sensing unit may be employed to obtain a useful result, it will be stated here generally that, as shown in Fig. 6, the output pulses from the flow sensing unit may be applied, via suitable pulse shaping circuits and power amplifiers 49 to indicating apparatus 50 adapted to indicate a value related to the repetition frequency of the pulses from the flow sensing unit, and this apparatus may be calibrated to indicate the rate of flow of the fluid. Likewise, by applying the pulses to suitable counting apparatus 51, there may be derived an indication of the total number of pulses in the output from the flow sensing unit, occurring after a starting time, and by suitably calibrating the counting apparatus, this indication may be made to read the total flow. By combining with the flow measuring apparatus, apparatus for compensating for variations in the density of the fluid, the indications of rate of flow and total flow may be made to read in gravimetric units.

The preferred embodiment of the invention has been illustrated and described, but changes and modifications can be made and some features can be used alone or in different combinations without departing from the invention as defined in the claims.

What is claimed is:

1. A flowmeter comprising a diamagnetic conduit having a spider integral therewith defining a bearing support located within the conduit, a coil of wire housed in a recess in a wall of the conduit, a magnetic core extending from the coil of wire, said core including a portion extending radially to an inner surface of the conduit, a rotor in the conduit and in the path of fluid flowing through the conduit, and an armature connected with the rotor and located in position to rotate close to said inner surface as the rotor turns.

2. A flowmeter comprising a ring having an internal spider integral therewith, a bearing support carried by said spider within said spider, a magnetic core extending through the ring to an inner surface of the ring, a rotor that turns in bearings in said bearing support in response to flow of fluid through the ring, and an armature element connected to the rotor in position to pass the inner end of the magnet core with each revolution of the rotor.

3. A flowmeter comprising a short length of plastic conduit having a bearing support therein, a magnetic coil molded into the wall of the plastic conduit, a magnetic core extending through the coil and molded into the plastic wall and bearing support, said magnet core comprising a permanent bar magnet, a rotor located within the conduit and rotatable in bearings carried by the bearing support, surfaces on the rotor angularly related to the longitudinal axis of the conduit for imparting rotation to the rotor from a stream of fluid passing through the conduit, and an armature connected to the rotor in position to pass under the inner end of the bar magnet with each revolution of the rotor.

4. A flowmeter comprising a plastic ring having a plastic bearing support extending inwardly to a region adjacent the longitudinal axis of the opening through the ring, a plurality of coils of wire molded into the plastic wall of the ring at angularly spaced regions around the axis, a magnetic core extending through each coil and having a pole face adjacent to the bearing support, a shaft carried by bearings in said bearing support, a rotor connected to the shaft and located in the path of a stream of fluid passing through the ring, and an armature connected to the shaft for rotation as a unit with the rotor, said armature being located in the flux field of the magnetic cores.

5. A flowmeter comprising a ring with a bearing support extending inwardly toward the center of the ring, the bearing support having an opening therethrough substantially coincident with the longitudinal axis of the opening of the ring, said ring having a circle of holes for receiving bolts, a flanged fitting with a circle of holes corresponding to those through the ring, said fitting having an opening therethrough that forms a continuation of the opening through the ring when the flange and ring are located with their corresponding bolt holes in alignment, a plurality of magnet cores extending through the ring and bearing support to a termination adjacent to the inner surface of the bearing support opening, bearings in said support, a shaft that turns in said bearings, an armature on the shaft in the field of the magnet cores, a rotor connected to the shaft and extending beyond the ring and into said fitting, a flow deflector in front of the rotor to prevent impact of fluid with the upstream center portion of the rotor, and streamlined surfaces that subject the downstream end of the rotor to fluid pressure that has an upstream component.

6. The flowmeter described in claim 5 with faces on opposite sides of the ring for receiving flanged fittings, and with fittings bolted against both of said faces to provide extensions of the opening through the ring, both of said fittings having internal threads for connection of the flowmeter in a pipe line.

7. The flowmeter described in claim 5 with the ring made of plastic material and with the magnet cores and wires surrounding the magnet cores molded into the wall of the plastic ring and with the magnet cores also molded into a portion of the bearing support, and in which the rotor is also made of plastic material with metal vanes with their root portions molded into the rotor.

8. A flowmeter comprising a ring that connects in a pipe line in a relation that makes the opening in the ring a part of the conduit through which the fluid flows while being measured, magnetic elements extending through a wall of the ring, a coil of wire in the magnetic circuit of said elements, a support within said ring, bearings in said support, a shaft that turns in said bearings, and an armature on the shaft in position to turn in front of the pole faces of the magnetic elements.

9. A flowmeter according to claim 8, including a flow deflector in front of said rotor, and streamlined surfaces that subject the downstream end of said rotor to fluid pressure that has an upstream component.

10. A flowmeter comprising a short section of conduit having a bearing support extending inward to a region adjacent to the longitudinal axis of the conduit, the bearing support having an opening therethrough extending in the direction of said axis, a plurality of permanent bar magnets extending through the wall of the conduit at angularly spaced regions around the longitudinal axis of the conduit, a connector of magnetic material across the outer ends of the bar magnets, said magnets having their inner ends of different polarity and located adjacent to the opening through the bearing support, a coil of wire surrounding each of the bar magnets and at least partially enclosed in the wall of the conduit, bearing means within the bearing support, a shaft that turns in the bearing means, an armature on the shaft in the flux field across the inner ends of the bar magnets, a rotor on the shaft with surfaces against which fluid in the conduit reacts to turn the rotor, and a flow deflector in front of the rotor.

11. A flow indicating device, comprising a plastic ring having a plastic bearing support extending inwardly and comprising an integral part of the ring structure, a plurality of magnet coils located at angularly spaced regions around the center longitudinal axis of the ring and molded into the wall of the ring, bearing means within the support, a shaft that turns in the bearing means, an armature on the shaft in line with the magnetic coils, and a rotor connected to the shaft and having sloping reaction faces against which longitudinally flowing fluid exerts pressure to turn the rotor.

12. A flow measuring device comprising a section of conduit containing a spider having radial legs, a magnet extending through one of said legs to a wall of the conduit, a rotor supported by said spider within the conduit with sloping reaction faces in the path of a fluid stream flowing longitudinally through the conduit, and an armature connected to the rotor in the flux field of the magnet.

References Cited in the file of this patent

UNITED STATES PATENTS

| Number | Name | Date |
|---|---|---|
| 1,305,803 | Irvin | June 3, 1919 |
| 1,934,903 | Apple | Nov. 14, 1933 |
| 2,082,539 | Fischer | June 1, 1937 |
| 2,221,943 | Fischer | Nov. 19, 1940 |
| 2,270,141 | Potter | Jan. 13, 1942 |
| 2,298,652 | Schwarzman et al. | Oct. 13, 1942 |
| 2,299,406 | Potter | Oct. 20, 1942 |
| 2,377,605 | Binckley | June 5, 1945 |
| 2,436,683 | Wood, Jr. | Feb. 24, 1948 |

FOREIGN PATENTS

| Number | Country | Date |
|---|---|---|
| 186,574 | Germany | June 26, 1907 |
| 841,639 | France | Feb. 13, 1939 |